US008800924B2

United States Patent
Groves et al.

(10) Patent No.: US 8,800,924 B2
(45) Date of Patent: Aug. 12, 2014

(54) AEROFOIL STRUCTURE

(75) Inventors: David Groves, Bristol (GB);
Christopher Payne, Bristol (GB)

(73) Assignee: Airbus Operations Limited, Bristol (GB)

( * ) Notice: Subject to any disclaimer, the term of this patent is extended or adjusted under 35 U.S.C. 154(b) by 367 days.

(21) Appl. No.: 12/998,913

(22) PCT Filed: Jan. 14, 2010

(86) PCT No.: PCT/GB2010/050040
§ 371 (c)(1),
(2), (4) Date: Jun. 15, 2011

(87) PCT Pub. No.: WO2010/082047
PCT Pub. Date: Jul. 22, 2010

(65) Prior Publication Data
US 2012/0132751 A1  May 31, 2012

(30) Foreign Application Priority Data
Jan. 14, 2009 (GB) .................................. 0900494.6

(51) Int. Cl.
*B64C 3/18* (2006.01)
*B21D 53/92* (2006.01)
(52) U.S. Cl.
USPC .................... 244/123.1; 244/135 R; 29/897.2
(58) Field of Classification Search
USPC ................ 244/123.1, 123.12, 123.14, 123.6, 244/123.7, 135 R; 29/897.2
See application file for complete search history.

(56) References Cited

U.S. PATENT DOCUMENTS 2,157,042 A * 5/1939 Wallis ........................ 244/123.7
2,311,683 A   2/1943 Naugle
(Continued)

FOREIGN PATENT DOCUMENTS

GB   447459   5/1936
GB   609313   9/1945
(Continued)

OTHER PUBLICATIONS

International Search Report for PCT/GB2010/050040, mailed May 11, 2010.
(Continued)

*Primary Examiner* — Rob Swiatek
(74) *Attorney, Agent, or Firm* — Nixon & Vanderhye P.C.

(57) ABSTRACT

An aerofoil structure (1) comprising at least two spars (2, 4) spaced apart in a fore and aft direction so as to define a fuel carrying volume between the spars, and at least one longitudinal corrugated reinforcing member (6, 7) disposed between the spars, each reinforcing member being corrugated in the longitudinal direction to form a series of forward ridges (9) on a forward side of the reinforcing member and a series of aft ridges (8) on an aft side of the reinforcing member, wherein each reinforcing member is directly attached by its forward ridges to one of the spars or to the aft ridges of an adjacent one of the reinforcing members, and wherein each reinforcing member is directly attached by its aft ridges to one of the spars or to the forward ridges of an adjacent one of the reinforcing members. Also, a method of manufacturing an aerofoil structure. The reinforcing member(s) may extend substantially the entire length of the structure to reduce the number of manufactured parts of the structure, increase the stiffness of the structure and reduce the weight of the structure.

21 Claims, 3 Drawing Sheets

(56) References Cited

U.S. PATENT DOCUMENTS

| | | | |
|---|---|---|---|
| 4,083,656 A | 4/1978 | Braswell et al. | |
| 4,657,615 A | 4/1987 | Braun et al. | |
| 5,457,884 A | 10/1995 | Fowler et al. | |
| 8,245,971 B2 * | 8/2012 | Makela et al. | 244/123.12 |

FOREIGN PATENT DOCUMENTS

| | | |
|---|---|---|
| GB | 1063619 | 3/1967 |
| GB | 1082352 | 9/1967 |
| GB | 2 041 861 | 9/1980 |
| WO | 131019 | 8/1919 |
| WO | WO 97/30236 | 8/1997 |
| WO | WO 2004/000643 | 12/2003 |

OTHER PUBLICATIONS

Written Opinion for PCT/GB2010/050040, mailed May 11, 2010.

Search Report for GB 0900494.6, dated May 14, 2009.

* cited by examiner

AEROFOIL STRUCTURE

This application is the U.S. National Phase of International Application No. PCT/GB2010/050040 filed 14 Jan. 2010 which designated the U.S. and claims priority to GB Patent Application No. 0900494.6 filed 14 Jan. 2009, the entire contents of each of which are hereby incorporated by reference.

FIELD OF THE INVENTION

The present invention relates to an aerofoil structure and a method of manufacturing an aerofoil structure.

BACKGROUND OF THE INVENTION

An aerofoil structure is a body, such as an aircraft wing or turbine blade, designed to provide a desired reaction force when in motion relative to a surrounding working medium. Some aerofoil structures, such as aircraft wings and wind turbine blades, generate lift perpendicular to the surrounding airflow. Others, such as racing car wings, generate downforce. Other examples of aerofoil structures include propeller blades, helicopter rotor blades, sailboat centreboards, and aircraft vertical and horizontal tail planes and control surfaces.

Aircraft wings, and many other aerofoil structures, typically comprise a thin outer skin supported by a reinforcing inner framework and are known as a semi-monocoque. The upper and lower skins, or covers, of a wing support the aerodynamic pressure distribution. These aerodynamic forces are transmitted to the reinforcing framework, which typically includes longitudinal stiffening spars and stringers, and transverse ribs. The spars include a spar web between upper and lower spar caps or flanges. The ribs resist the aerodynamic pressure loads to maintain the aerofoil cross-section shape, and also distribute concentrated loads such as from the undercarriage. The stringers are attached to the skin and ribs to divide the skin into small panels. The skin and spar webs act together to resist the shear and torsional loads; and the skin, spar caps and stringers act together to resist the axial and bending loads.

This typical aircraft wing construction provides advantages in terms of manufacturability and maintenance but has shortcomings as the main structural spar and rib elements do not always follow the lines of maximum load leading to structural inefficiency. This is particularly the case for swept aircraft wings commonly used for commercial airliners which operate at transonic speeds. Torque on swept wings leads to sub-optimal loading of ribs that run from the leading edge to the trailing edge of the wing, generally perpendicular to the main spar. With recent shifts away from metallic aircraft wing design towards composite or plastic structures, some benefits of these new materials are currently not being exploited by following traditional wing designs.

SUMMARY OF THE INVENTION

A first aspect of the invention is an aerofoil structure comprising at least two spars spaced apart in a fore and aft direction so as to define a fuel carrying volume between the spars, and at least one longitudinal corrugated reinforcing member disposed between the spars, each reinforcing member being corrugated in the longitudinal direction to form a series of forward ridges on a forward side of the reinforcing member and a series of aft ridges on an aft side of the reinforcing member, wherein each reinforcing member is directly attached by its forward ridges to one of the spars or to the aft ridges of an adjacent one of the reinforcing members, and wherein each reinforcing member is directly attached by its aft ridges to one of the spars or to the forward ridges of an adjacent one of the reinforcing members.

Loads in a structure always follow straight lines between points. The traditional spar/rib "box" design described above and commonly used in aircraft wings and many other aerofoil structures has no reinforcing members that lie on or close to the torque load lines, which typically lie at around 45 to 60 degrees with respect to the main spar. The torque loading of aerofoil structures having the traditional spar/rib design is therefore mostly supported by the covers. The present invention is advantageous in that portions of each corrugated reinforcing member between its adjacent ridges can more closely follow these torque load lines, leading to a more efficient structural design. Each corrugated reinforcing member is also able to support the aerodynamic loads to maintain the aerofoil cross-section shape, so may partially or fully replace the ribs of the traditional design. Each corrugated reinforcing member is also able to support axial or bending loads, so the stringers of the traditional design may be of a reduced dimension or omitted altogether.

Preferably, each reinforcing member extends substantially the entire length of the structure to reduce the number of manufactured parts of the structure, increase the stiffness of the structure and reduce the weight of the structure.

Preferably, the pitch of the corrugations varies along the length of each reinforcing member. The pitch may be dependent upon the local loads to be carried by the structure.

It is not essential that all corrugations of the reinforcing member extend up to the spar, unless structural integrity requires this to be so. It some circumstances it will be sufficient that only some corrugations of the reinforcing member meet the spar.

Most aerofoil structures include at least two spars spaced apart in a fore and aft direction. Where a two main spar design is used, the spars are typically spaced apart in a fore and aft direction, close to the leading and trailing edges, and the ribs run between the spars. Designs including additional spars between the main spars at the leading and trailing edges are also known.

In a preferred embodiment, the aerofoil structure includes two spars spaced apart in a fore and aft direction, and two corrugated longitudinal reinforcing members disposed between the spars. The front reinforcing member is directly attached to the front spar by its forward ridges, and the rear reinforcing member is directly attached to the rear spar by its aft ridges. The front and rear reinforcing members are preferably arranged such that the aft ridges of the front reinforcing member and the forward ridges of the rear reinforcing member meet along a longitudinal centre line of the structure. In this way, the reinforcing members form a spar-like member along the longitudinal centre line. The corrugated reinforcing members may be attached to one another by their ridges along the centre line.

The corrugated reinforcing member(s) may be formed having various corrugated shapes when viewed in plan view (as connected to an upstanding spar web), approximating to various different waveforms. For example, the corrugations may approximate to a triangle, saw-tooth, sinusoidal, square or rectangular waveform. Preferably, each corrugated reinforcing member has a shape approximating to a trapezoidal waveform when viewed in plan view. In a preferred embodiment of the present invention where front and rear back-to-back reinforcing members are provided in the aerofoil structure, the trapezoidal corrugated reinforcing members create a series of approximately hexagonal patterns within the structure. The size and shape of these patterns may vary along the length of the aerofoil structure depending on the local load levels/orientations.

To achieve an aerodynamic surface, the aerofoil structure preferably includes a covering over the spar(s) and the corrugated reinforcing member(s). The corrugated reinforcing member(s) are therefore preferably profiled to accommodate the covering. The covering may include separate upper and lower covers, or skins, connected to the spar(s) and the reinforcing member(s). The reinforcing member(s) may be attached to the covers using conventional "rib feet".

A second aspect of the invention is a method of manufacturing an aerofoil structure, the method comprising providing at least two spars spaced apart in a fore and aft direction so as to define a fuel carrying volume between the spars; providing at least one longitudinal corrugated reinforcing member, each reinforcing member being corrugated in the longitudinal direction to form a series of forward ridges on a forward side of the reinforcing member and a series of aft ridges on an aft side of the reinforcing member; directly attaching each reinforcing member by its forward ridges to one of the spars or to the aft ridges of an adjacent one of the reinforcing members, and directly attaching each reinforcing member by its aft ridges to one of the spars or to the forward ridges of an adjacent one of the reinforcing members.

The method preferably comprises providing two of the spars spaced apart in a fore and aft direction, providing two of the corrugated longitudinal reinforcing members between the two spars, directly attaching the front reinforcing member to the front spar by its forward ridges, and directly attaching the rear reinforcing member to the rear spar by its aft ridges.

The method may further comprise attaching the aft ridges of the front reinforcing member and the forward ridges of the rear reinforcing member together. This may occur prior to attachment of the reinforcing members to the spars.

The method may further comprise machining the corrugated reinforcing members to a desired edge profile.

The step of providing the or each reinforcing member may include shaping the corrugations in a series of stages to form successively more pronounced ridges.

BRIEF DESCRIPTION OF THE DRAWINGS

Embodiments of the invention will now be described with reference to the accompanying drawings, in which.

DETAILED DESCRIPTION OF EMBODIMENTS

Figure 1:
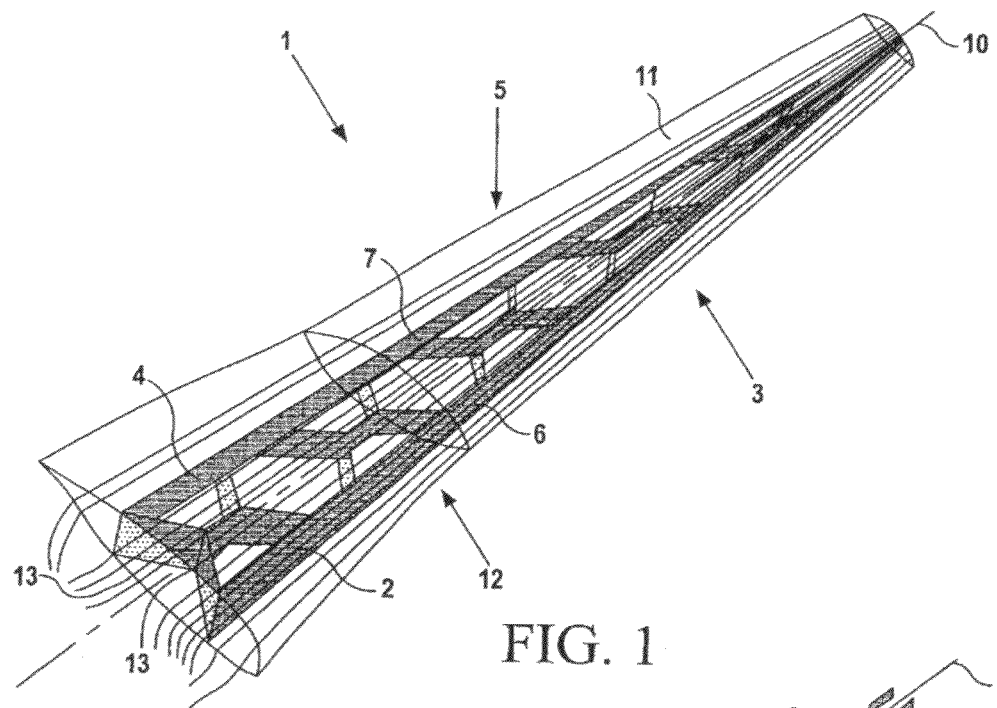
FIG. 1 shows an aircraft wing including a front spar and a rear spar, each spar being connected to a corrugated longitudinal reinforcing member.

An aircraft wing 1 embodying the present invention is shown in FIG. 1. The wing includes a front spar 2 towards a leading edge 3 and a rear spar 4 towards a trailing edge 5 of the wing 1. A pair of back-to back corrugated reinforcing members 6,7 are disposed between the front 2 and rear 4 spars.

Figure 2:
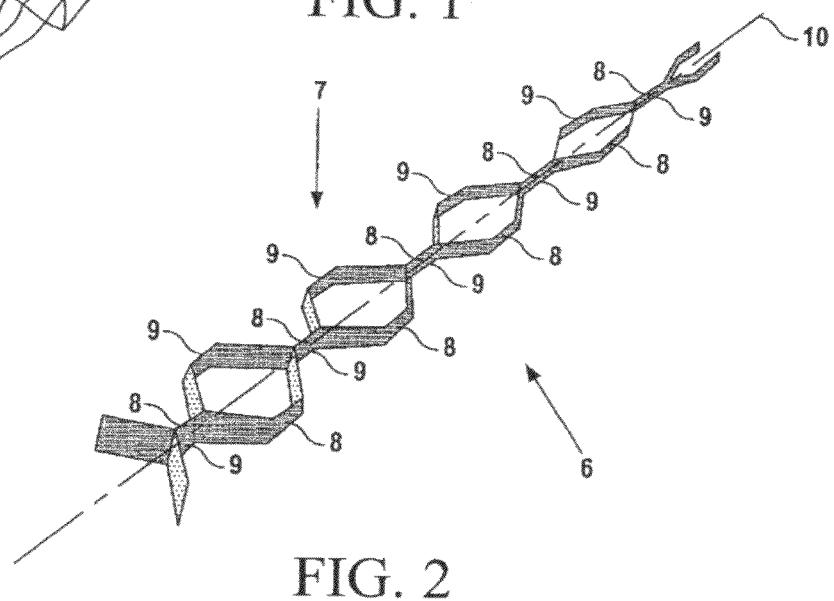
FIG. 2 shows the corrugated reinforcing members of FIG. 1 in isolation.

The pair of back-to-back corrugated reinforcing members 6,7 are shown in isolation in FIG. 2. Each reinforcing member 6,7 has corrugations forming a series of forward ridges 8 and aft ridges 9. The reinforcing members 6,7 are arranged such that respective forward and aft ridges 8,9 thereof sit back-to-back substantially along a longitudinal centre line 10 of the wing 1. The reinforcing members 6,7 are connected to one another where their respective ridges 8,9 meet along the centre line 10.

The front reinforcing member 6 is arranged such that its forward ridges 8 meet the front spar 2. The rear reinforcing member 7 is arranged such that its aft ridges 9 meet the rear spar 4. The spars 2,4 are similar to those used in the conventional spar/rib wing design, and each include an upstanding web and upper and lower spar caps or flanges. Note that the caps or flanges are not shown in FIG. 1. The reinforcing members 6,7 are connected to the spar webs at points where their forward or aft ridges 8,9 meet their respective spars 2,4.

Figure 3:
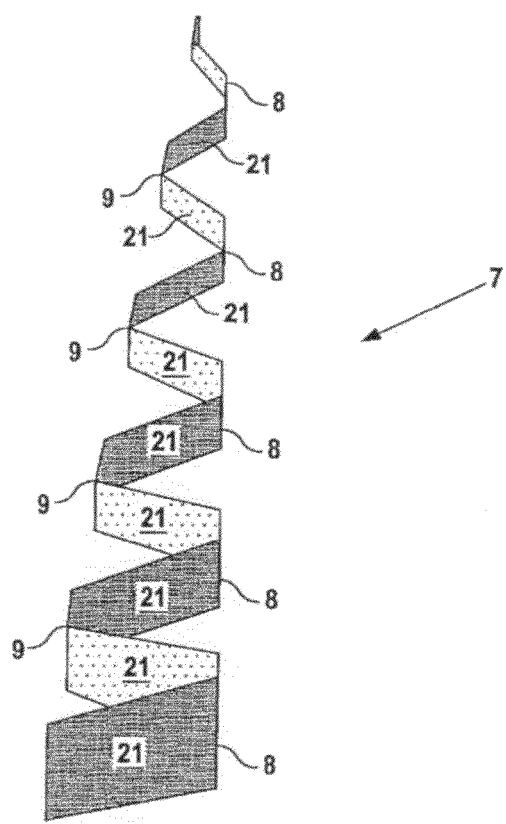
FIG. 3 shows one of the corrugated reinforcing members of FIG. 2 in isolation.

The front and rear reinforcing members 6,7 are essentially mirror images of one another and the rear reinforcing member 7 is shown in detail in FIG. 3. The reinforcing member 7 tapers along its length to conform to the tapering of the wing 1 from root to tip. The pitch of the corrugations may vary along the length of the reinforcing member 7. The greater the pitch the more oblique the angle the corrugations make with the centre line 10. The pitch of the corrugations is designed to match the local load magnitude and direction the reinforcing member 7 is subjected to. Since the wing 1 is more highly loaded at its root than at the tip the pitch of the corrugations may be designed to generally increase along the length of the reinforcing member 7 from the root to the tip.

The corrugations of the reinforcing members 6,7 approximate to a trapezoidal waveform when viewed in plan view (as connected to the upstanding spar webs). The trapezoidal corrugated reinforcing members create a series of approximately hexagonal patterns within the structure when the reinforcing members 6,7 are joined back-to-back by their ridges 8,9. The size and shape of the hexagonal patterns vary along the length of the wing 1 due to the taper and also any pitch variation of the corrugations.

The design of the aerofoil structure in accordance with this invention follows similar principles to the "geodetic" aircraft design concept pioneered by Barnes Wallis, so that the corrugations substantially follow lines of maximum load, thereby optimising the structure. Since loads always follow straight lines between points in a structure, the trapezoidal waveform of the preferred embodiment is more preferred than, say, the sine waveform alternative.

The wing 1 further includes a covering comprising an upper cover, or skin 11 and a lower cover, or skin, 12. The upper and lower covers 11,12 are attached to the reinforcing members 6,7 and the flanges (not shown) of the front and rear spars 2,4. The covers 11,12 are constructed of multiple sections joined together for ease of manufacture but may be formed as single pieces. The covers 11,12 are reinforced with longitudinal stringers 13 (shown in FIG. 1) of conventional type. However, the stringers 13 have a reduced dimension compared with the stringers used in a conventional wing rib/spar design due to the ability of the reinforcing members 6,7 to resist a substantial amount of wing bending and axial load, which conventional ribs cannot do. The spars 2,4 support leading and trailing edge devices, such as slats, flaps and ailerons, similar to those of conventional wing designs.

The "wing box" formed by the front and rear spars 2,4, reinforcing members 6,7, and covers 11,12 is used as a fuel tank for aircraft fuel, as is common for wings of the conventional spar/rib design. Fuel in partially filled tanks poses a problem known as "dynamic fuel slosh", which occurs as the fuel sloshes around due to changes in acceleration of the aircraft. As the fuel sloshes around, transient forces are transferred to the walls of the tank and so to the aircraft. Dynamic fuel slosh can be a problem in aircraft stability and control if the motion of the fuel coincides with that of the aircraft. The ramped regions 21 between adjacent forward and aft ridges 8,9 of the reinforcing members 6,7 mean that substantial parts of the fuel tank walls are not perpendicular to the typical directions of motion of the fuel. This reduces the detrimental effects of fuel slosh when compared with wings of conventional spar/rib construction.

The lower cover 12 is fitted with removable man-hole covers so that the interior of the wing 1 can be inspected, such that, for example, any corrosion issues associated with use of the wing interior as a fuel tank can be assessed at service intervals. The size of each "pocket" in the hexagonal pattern formed by the reinforcing members 6,7 may be greater than that formed in the conventional spar/rib wing design due to the more efficient structural design, although the size of each pocket may need to be limited to 800 mm in diameter to comply with inspection requirements. The increased size of spaces within the wing 1 allows for better access within the wing.

The front and rear reinforcing members 6,7 are arranged such that their respective aft 9 and forward 8 ridges meet along the longitudinal centre line 10 of the structure. In this way, the reinforcing members 6,7 form a spar-like member along the longitudinal centre line 10. The reinforcing members 6,7 are therefore able to resist axial and bending loads of the wing 1, and so the axial and bending loads upon the main front and rear spars 2,4 are appropriately reduced. This allows for optimisation of the spars 2,4 and weight saving. The reinforcing members 6,7 extend substantially the entire length of the wing 1 from root to tip. This continuous design increases wing stiffness and saves weight. If the aerofoil structure has a large axial extent then it may be necessary to form the reinforcing members 6,7 in one or more sections joined end-to-end.

Edges of the reinforcing members 6,7 are profiled to match the curvature of the upper and lower covers 11,12. The covers 11,12 are attached to the reinforcing members 6,7 using conventional rib feet. Alternatively, the edges of the reinforcing members 6,7 may be formed having a flange, which can be attached to the covers 11,12.

The aerofoil structure is preferably formed of composite material, such as carbon fibre reinforced plastic, glass fibre reinforced plastic, or Kevlar™. Alternatively, the aerofoil structure may be formed in metal, such as aluminium or titanium. The aerofoil structure may also be formed in thermoplastic, such as polyetheretherketone (PEEK). The shape of the reinforcing members 6,7 is well suited to composite or thermoplastic materials due to the corrugations. If metal is used, flat sheet metal may be passed through a series of cogged rollers to form the corrugations. This technique could also be used for composite where pre-preg layers are moulded into shape by passing through rollers prior to final cure.

Figure 4:
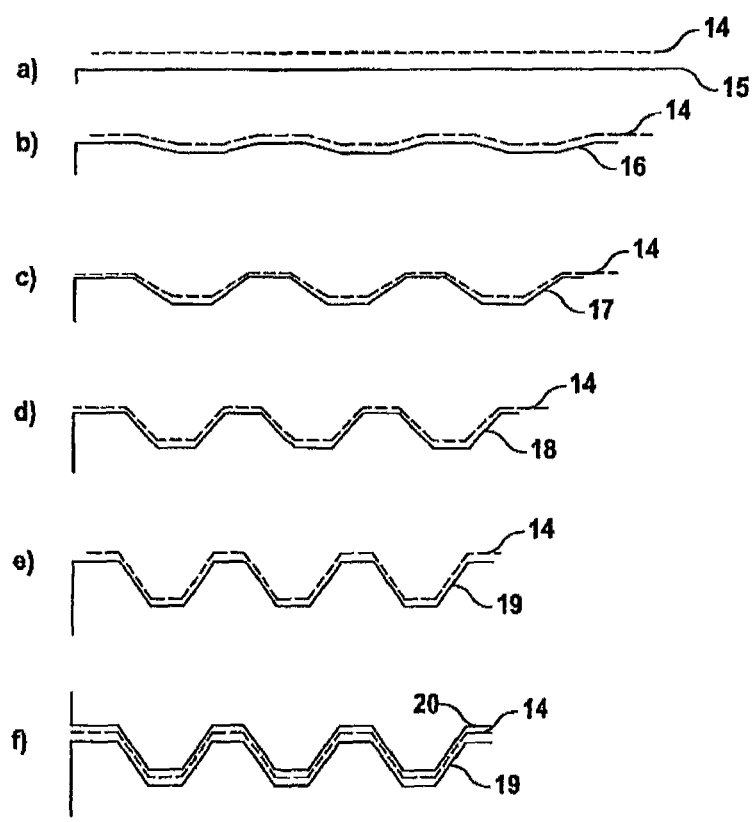
FIG. 4 shows a manufacturing sequence for producing a corrugated reinforcing member from composite material.

In a preferred method of manufacture of the reinforcing members 6,7, fibre reinforced composite layers are moulded in a multiple stage forming process. In the primary stage, the layers are formed into a rough shape and in the secondary stage, the layers are formed into the final desired shape. A schematic of this process is shown in FIGS. 4 a)-f).

In a), a stack of fibre reinforced plies 14 is consolidated upon a horizontal flat surface 15 in a debulking process to remove excess air. The pre-consolidated stack 14 is then moved in b) to a first tool 16 and heat and/or pressure is applied to mould the stack 14 to the shape of the tool 16. Caul plates may be used between the ridges of the tool 16 and the stack 14. This process is repeated in steps c) to e) for second through fourth tools 17, 18, 19 to increase the depth of the corrugations step-wise. In the final step, f), a corresponding tool 20 is brought down so as to sandwich the stack 14 with the final tool 19. The formed stack is then cured for which an autoclave may be required to achieve the desired temperature and pressure.

The number of steps, and hence tools required, is dependent on the thickness of the stack 14, the temperature and/or pressure applied and the orientation of the plies in the stack. Four tools 16-19 are shown in FIG. 4 only as an example, and as many tools as necessary may be used. If required, a corresponding tool may be used also in steps b) to e) to sandwich the plies, similarly to the final step, f). Alternatively, no corresponding tool may be required in the final step, f). The debulking and shape forming steps may be performed for all plies together, or this process may be repeated for groups of plies to build up the desired thickness of plies. Pressure intensifiers may need to be used to encourage the plies to conform to the shape of the tool(s).

The composite plies used in the above method may be pre-preg or dry fibre. In the case of dry fibre, resin is injected prior to cure. The stack of plies 14 preferably includes a high proportion of +/−45 degree plies so as to improve the mouldability of the stack over the successive tools 16-19. Where a flange is required on one or more edges of the reinforcing members 6,7, for attachment to the covers 11,12, a flange forming process step is included between step f) and the final cure. The stack 14 is formed into the corrugated shape having a greater width dimension than required for each reinforcing member 6,7. A female tool may be used with applied heat and/or pressure to the edge of the stack 14 to form the flanges such that the edge of the stack 14 has a C-section profile.

The corrugated shape of the reinforcing members 6,7 is well suited to the use of thermoplastic materials instead of composite or metal. Thermoplastic sheet material may be formed over one or more tools similar to those shown in FIG. 4 in a fast, high production volume method. Alternatively, sheet thermoplastic material may be passed through heated rollers to achieve the desired shape.

The reinforcing members 6,7 are preferably adhesively bonded to the front and rear spars 2,4 by their forward 8 and aft 9 ridges respectively. Alternatively, the reinforcing members may be attached to the spars 2,4 by bolting. The reinforcing members 6,7 are joined together by their ridges 8,9 along the centre line 10 by adhesive bonding or bolting.

A method of manufacturing the aerofoil structure will now be described with reference to the wing 1 as a purely exemplary embodiment. The reinforcing members 6,7 are manufactured separately by the above forming method and then joined together by their ridges 8,9 along the centre line 10. The joined reinforcing members 6,7 are then profiled along their edges by machining to match the desired local shape of the covers 11,12 to which they are to be attached. The front and rear reinforcing members 6,7 are then attached to their respective spars 2,4. Rib feet are applied to the edges of the reinforcing members 6,7, unless flanges have been formed on the edges of the reinforcing members 6,7, and the covers 11,12 are then attached to the spars and to the reinforcing members 6,7.

Whilst the above purely exemplary embodiment has been described with reference to an aircraft wing having two spars and two reinforcing members, the invention can also be applied to other aerofoil structure having two or more spars. In an alternative two-spar structure, a single reinforcing member may be attached between the spars such that its forward ridges are attached to the front spar and its aft ridges are attached to the rear spar. Three or more reinforcing members may be attached between a pair of spars. In the case of an aerofoil structure having three or more spars, one or more reinforcing members may be attached between adjacent spars.

Although the invention has been described above with reference to one or more preferred embodiments, it will be appreciated that various changes or modifications may be made without departing from the scope of the invention as defined in the appended claims.

The invention claimed is:

1. An aerofoil structure comprising:
   at least two spars spaced apart in a fore and aft direction so as to define a fuel carrying volume between the spars, and
   at least two longitudinal corrugated reinforcing members disposed between the spars, each of said at least two reinforcing member is corrugated in the longitudinal direction to form a series of forward ridges on a forward side of the reinforcing member and a series of aft ridges on an aft side of the reinforcing member, and wherein the pitch of said corrugations varies along the length of each of said at least two reinforcing members and the pitch is dependent upon the local loads to be carried by the structure.

2. An aerofoil structure according to claim 1, wherein each reinforcing member extends substantially the entire length of the structure.

3. An aerofoil structure according to claim 1, wherein a front reinforcing member is directly attached to the front spar by said forward ridges, and a rear reinforcing member is directly attached to the rear spar by said aft ridges.

4. An aerofoil structure according to claim 3, wherein there are only two reinforcing members and the aft ridges of the front reinforcing member and the forward ridges of the rear reinforcing member meet along a longitudinal centre line of the structure.

5. An aerofoil structure according to claim 4, wherein the front and rear reinforcing members are attached to one another by respective ridges along the centre line.

6. An aerofoil structure according to claim 3, wherein the at least two corrugated reinforcing members create a series of hexagonal patterns within the structure.

7. An aerofoil structure according to claim 1, wherein at least one of said corrugated reinforcing members includes a ramped region between adjacent fore and aft ridges, thereby reducing fuel slosh.

8. An aerofoil structure according to claim 1, wherein the aerofoil structure comprises an aircraft wing.

9. An aerofoil structure according to claim 1, wherein the pitch increases from root to tip of the aerofoil structure.

10. A method of manufacturing an aerofoil structure, the method comprising the steps of:
    providing at least two spars spaced apart in a fore and aft direction so as to define a fuel carrying volume between the spars;
    providing at least one longitudinal corrugated reinforcing member, each of said at least one reinforcing member is corrugated in the longitudinal direction to form a series of forward ridges on a forward side of the at least one reinforcing member and a series of aft ridges on an aft side of the at least one reinforcing member;
    directly attaching each of said at least one reinforcing member by said forward ridges to one of the spars or to the aft ridges of an adjacent one of the said at least one reinforcing member, and
    directly attaching each of said at least one reinforcing member by said aft ridges to one of the spars or to the forward ridges of an adjacent one of the reinforcing members, wherein the pitch of the corrugations varies along the length of each reinforcing member and the pitch is dependent upon the local loads to be carried by the structure.

11. A method according to claim 10, comprising the step of providing two of the corrugated longitudinal reinforcing members between the two spars, directly attaching the front reinforcing member to the front spar by said forward ridges, and directly attaching the rear reinforcing member to the rear spar by said aft ridges.

12. A method according to claim 11, further comprising attaching the aft ridges of the front reinforcing member and the forward ridges of the rear reinforcing member together.

13. A method according to claim 12, wherein the front and rear reinforcing members are attached to one other prior to their attachment to the spars.

14. A method according to claim 12, further comprising machining the corrugated reinforcing members to a desired edge profile.

15. A method according to claim 10, wherein the step of providing the at least one corrugated reinforcing member includes the step of shaping the corrugations in a series of stages to form successively more pronounced ridges.

16. A method according to claim 10, wherein said method is a method of manufacturing an aircraft wing.

17. A method according to claim 10, wherein the pitch increases from root to tip of the aerofoil structure.

18. An aerofoil structure comprising:
    at least two spars spaced apart in a fore and aft direction so as to define a fuel carrying volume between the spars; and
    a longitudinal corrugated reinforcing member disposed between said at least two spars, the reinforcing member is corrugated in the longitudinal direction to form a series of forward ridges on a forward side of the reinforcing member and a series of aft ridges on an aft side of the reinforcing member, wherein the reinforcing member is directly attached by said forward ridges to one of said at least two spars and is directly attached by said aft ridges to another of said at least two spars, and wherein the pitch of the corrugations varies along the length of the reinforcing member and the pitch is dependent upon the local loads to be carried by the structure.

19. An aerofoil structure according to claim 18, wherein at least one of said corrugated reinforcing members includes a ramped region between adjacent fore and aft ridges, thereby reducing fuel slosh.

20. An aerofoil structure according to claim 18, wherein the aerofoil structure comprises an aircraft wing.

21. An aerofoil structure according to claim 18 wherein the pitch increases from root to tip of the aerofoil structure.

* * * * *